March 17, 1931.    A. A. KRAMER    1,797,212
TANK
Filed March 19, 1925    2 Sheets-Sheet 1
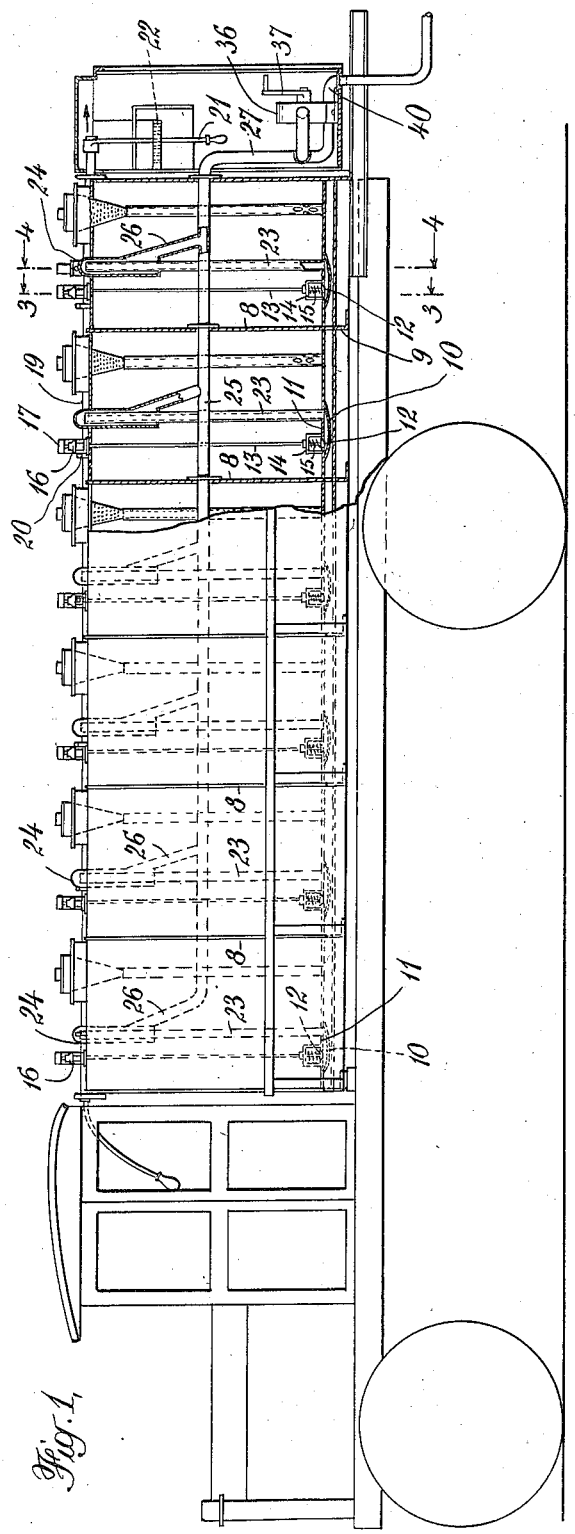
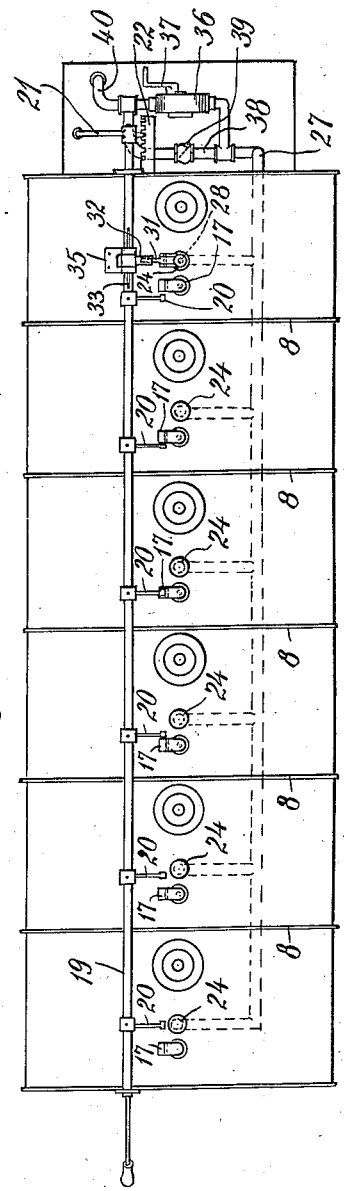
INVENTOR
Andrew A. Kramer,
BY
ATTORNEYS March 17, 1931. A. A. KRAMER 1,797,212
TANK
Filed March 19, 1925 2 Sheets-Sheet 2
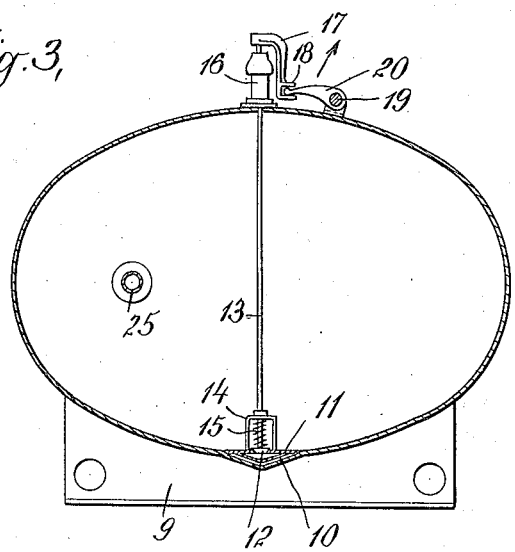
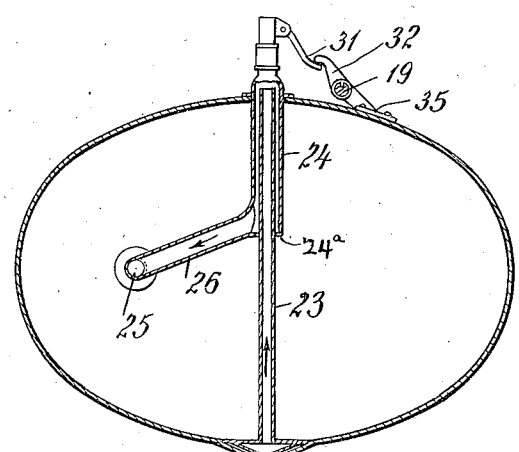
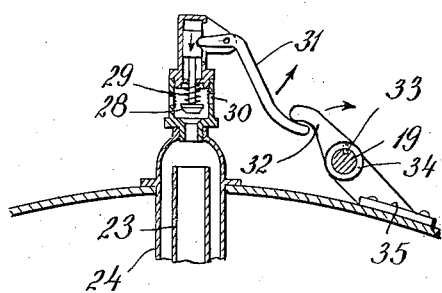
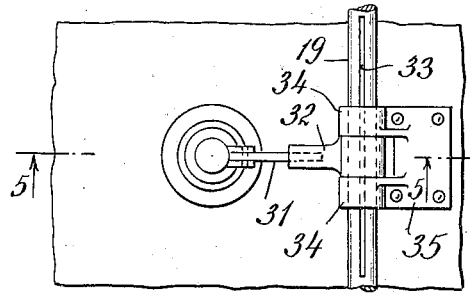
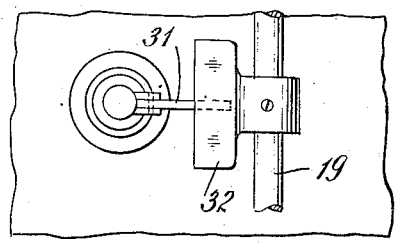
INVENTOR
Andrew A. Kramer,
BY
ATTORNEYS Patented Mar. 17, 1931

1,797,212

UNITED STATES PATENT OFFICE

ANDREW A. KRAMER, OF KANSAS CITY, MISSOURI

TANK

Application filed March 19, 1925. Serial No. 16,728.

This invention relates to tanks for use in distributing and dispensing volatile liquids, particularly gasoline, and is directed to the provision of a tank of an improved construction adapted to be mounted on the chassis of an automobile for use in distributing gasoline to a multiplicity of service stations. More particularly the invention relates to a tank of the type in which the body is subdivided into a plurality of separate compartments such that the gasoline may be withdrawn from any selected one of the several compartments and from the several compartments in any order. By so subdividing the entire amount of gasoline carried by the vehicle into a plurality of separate supplies in the several compartments, the element of danger incident to conveying such an inflammable fluid, particularly in crowded city streets, is greatly reduced.

The present invention involves the provision of a compartment tank of an improved construction such that the danger incident to leakage of the gasoline from the tank is greatly reduced, though the withdrawal of the gasoline from the tank in accordance with the intended procedure can be effected conveniently and rapidly.

A feature of the invention of primary importance is the provision for the withdrawal of the gasoline from the tank compartments by means of a siphon, as this increases greatly the element of safety and at the same time makes it possible to withdraw the gasoline rapidly and conveniently and by means of simple mechanism. The tank is divided into a plurality of compartments and a siphon is provided for each of these compartments through which the gasoline flows from the compartment to a manifold discharge pipe which conveys the gasoline to the discharge outlet at the rear of the tank.

In the employment of such a siphon arrangement for the discharge of gasoline from the tank, a very effective safety expedient is the provision of a vacuum breaker by which air may be admitted to or excluded from the bend at the top of the siphon, and it is very desirable to provide for the opening and closing of this siphon breaker by the mechanism employed for closing and opening a valve regulating the flow of gasoline from the corresponding tank compartment as is disclosed in an application for patent filed by me on January 21, 1925, and serially numbered 3,776.

In accordance with the present invention, the tank is divided into a plurality of tank compartments, a single discharge pipe is provided for carrying the gasoline discharged from all of the several compartments, a siphon is provided for each compartment for conveying the gasoline from that compartment to the discharge pipe, a siphon breaker is provided on one of the several siphons and the operating mechanism for the outlet valves of the several compartments is so arranged that whenever any one of these several valves is opened the one siphon breaker is closed. In this way the contents of each of the several compartments are protected by a siphon, the one siphon breaker is effective in connection with the contents of all of the several compartments to stop the discharge of gasoline instantly when that is desired and the operation of withdrawing the gasoline from the tank compartments is expedited and may be accomplished much more readily.

In accordance with the preferred embodiment of the invention, a manually operated pump is provided at the rear of the tank for starting the flow from any compartment through its siphon to the common discharge pipe and when the flow has been thus started it is continued through a by-pass around the pump until the contents of the compartment are completely discharged or the siphon breaker is opened coincident with closure of the vave controlling the outlet from the compartment.

Another feature of the present invention resides in the construction of the tank whereby great strength and rigidity are attained and at the same time danger of such an injury as would result in discharge of gasoline from one or more of the tank compartments is greatly decreased. These objects are achieved by the provision of a single discharge pipe running lengthwise of the tank through all of the tank compartments, within the wrapper sheets of the several compartments and passing through openings in the partitions separating adjacent compartments, to which partitions the pipe is welded or otherwise secured to form a liquid-tight joint. Within each compartment the siphon of that compartment communicates with the discharge pipe. Preferably there is a sump at the bottom of each compartment, a valve controlling the outlet from the compartment to the sump, a valve rod for operating the valve extending across the compartment and out at the top thereof, and a siphon pipe extending from the sump up through the compartment to a point above the top wall thereof and then down into the compartment where a connection is made to the discharge pipe. By the employment of this construction a single discharge pipe serves to convey the discharge from all of the several compartments and that single discharge pipe is housed within the tank so that danger of injury to it by collision or otherwise is reduced to a minimum. Furthermore, by securing this discharge pipe to all of the several partition plates, it serves as a brace for contributing rigidity to the structure as a whole. Moreover, I find that such a construction as that above outlined possesses marked advantages with respect to low cost of manufacture.

The preferred embodiment of the invention is illustrated in the accompanying drawings in which Fig. 1 is an elevation partly in section of a tank mounted upon the chassis of an automobile; Fig. 2 is a top view of the tank; Figs. 3 and 4 are transverse sections on the lines 3—3 and 4—4 of Fig. 1; Fig. 5 is a detailed view of the siphon breaker in section on line 5—5 of Fig. 6 and Figs. 6 and 7 are alternative operating mechanisms for the siphon breaker.

Referring to these drawings, the tank is of generally cylindrical form and is subdivided by partition plates into a plurality of compartments, six such compartments being shown in this instance. The partition plates 8 are preferably extended downwardly beyond the wrapper sheets as shown at 9 and these extensions form bolsters which may be employed in securing the tank upon the chassis and which serve to stiffen the construction of the tank as a whole.

The bottom wall of each tank compartment is pressed to form a sump 10 and over this sump a plate 11 is secured, preferably by welding its edges to the wrapper sheet about the periphery of the sump. In the plate 11 is a valve opening controlled by a valve 12. This valve is mounted on the lower end of a rod 13 extending vertically upward across the tank compartment and through the top wall thereof. At its lower end the rod 13 is guided by a frame 14 secured upon the plate 11 and a spring 15 arranged between the valve 12 and the frame 14 presses the valve always toward its closed position. At its upper end the valve rod 13 extends through an opening in the top wall of the tank compartment and through a guide 16 mounted upon that wall and the upper end of the rod carries an arm 17 having parallel jaws 18 at its end for cooperation with the operating mechanism of the valve. This operating mechanism may include a rod 19 extending the full length of the tank and mounted to rock and to slide axially in suitable bearings. A plurality of operating arms 20 are secured upon the rod 19 and accurately spaced thereon so that only one of them is in position to cooperate with an arm 17 at any one time, though but slight movement of the rod 19 in the direction of its axis is necessary to carry one arm 20 into and another out of coaction with the corresponding arm 17. This is indicated in Fig. 2. At the end of the tank within a compartment provided for the operating mechanism used in discharging gasoline from the tank, is an arm 21 for operating the rod 19, this arm being arranged for coaction with a guide 22 having a plurality of slots therein corresponding to the positions of the rod 19 for operating one or another of the several outlet valves.

Within each of the several compartments is a siphon which includes a vertically disposed pipe 23 whose lower end is secured in an opening in the plate 11 so that it is in communication with the sump. The upper end of the pipe 23 extends through the top wall of the tank compartment and is located within a pipe 24 whose upper end is closed and spaced from the upper end of the pipe 23. The lower end of the pipe 24 is also closed by a suitable annulus 24ª.

A single discharge pipe 25 is provided for all of the several compartments and it communicates with the siphons of all of the compartments. This single discharge pipe extends the full length of the tank and passes through openings in the partition walls in which openings it is secured by welding or otherwise. The connections from the discharge pipe 25 to the siphons are shown at 26, one within each compartment. It will be seen that the discharge pipe 25 and its connections are housed within the tank structure so as to be well protected against injury due to a collision. At the rear end the discharge pipe 25 passes through the rear wall into the can compartment as shown at 27 where it leads to the discharge outlet.

The siphon in the rear compartment is provided with a siphon breaker which may be constructed as shown in Fig. 5 and the operating mechanism for operating the several outlet valves 12 is so constructed that the siphon breaker is closed whenever any one of the several outlet valves is open.

Fig. 5 shows the pipes 23 and 24 of the siphon for the rear-most compartment. Communicating with the top of the pipe 24 is a valve 28 which is pressed by a spring 29 toward a seat in order to close a passage from the top of the pipe 24 to the atmosphere through openings 30 covered with a fine screen. The valve 28 may be raised to its open position against the tension of its spring 29 by a lever 31 pivoted upon the casing of the valve. The lower end of this lever 31 is adapted to be engaged and operated by a crank arm 32 mounted upon the longitudinal valve-operating rod 19. Provision must be made whereby this siphon breaker would be operated whenever any one of the outlet valves of the tank compartments is operated, that is, the longitudinal movement of the rod 19 to select a particular outlet valve which is to be opened or closed must not disconnect the siphon breaker from its operating mechanism. In Fig. 6 the shaft 19 is shown as having the crank arm 32 mounted thereon by a key and key-way 33 and the arm 32 is held against movement with the rod 19 when the latter is moved longitudinally by the sleeves 34 of a bearing 35 in which the rock shaft 19 is mounted.

In Fig. 7 the crank arm 32 is mounted rigidly upon the rock shaft 19 but it is extended in the direction of the length of the rod so that it is in cooperative relation to the lever 31 in all positions to which the rock shaft 19 must be moved axially in selecting one or another of the several outlet valves.

In order to start the discharge of the gasoline in any compartment out through its siphon, a pump is provided in the rear compartment as shown at 36 provided with a handle 37 for operating it manually. The pump is connected to the end 27 of the discharge pipe 25 as shown in Figs. 1 and 2 but a by-pass 38 is provided around the pump 36 through which the flow of the gasoline is continued after it has been started by the pump. In this by-pass 38 is a check valve 39 which closes automatically when the pump 36 is operated but opens after the flow of gasoline has been started to permit the flow to continue through the by-pass. Both the by-pass 38 and the outlet side of the pump extend to an outlet pipe 40 to which a flexible hose or faucet or nozzle of any suitable construction may be attached.

In dispensing gasoline with a tank of this construction the operator selects the compartment from which he desires to discharge the liquid by manipulating the handle 21 to move the rod 19 axially such distance as is necessary to cause the arm 20 to engage the lever 17 of the outlet valve of the selected tank. Having done this, the operator rocks the shaft 19 by means of the arm 21 and thus opens the outlet valve 12 of the selected compartment, whereupon the liquid in that compartment flows into the sump 10 and rises within the siphon pipe 23. The details of the construction of this operating mechanism may be made in accordance with an application for patent filed by me on April 18, 1924, and serially numbered 707,409.

In moving the rod 19 to the position for selecting the desired outlet valve, the connections for operating the siphon breaker valve are maintained and therefore when the shaft 19 is rocked in its bearings the arm 32 thereon actuates lever 31 to close the siphon breaker valve 28. This closure of the breaker valve occurs whenever any one of the outlet valves of the several compartments is opened regardless of which one of the several compartments is selected. Next the operator actuates the pump 36 by turning the handle 38 a few times and as the check valve 39 closes when the pump is operated a suction is produced by the pump through the pipe connections 27, 25, 26, 24 and 23 upon the liquid in the pipe 23 of the compartment whose valve 12 has been opened. The creation of this suction is possible by reason of the fact that the siphon breaker valve 28 has been closed and in response to the suction the liquid rises in the pipe 33 to the upper end thereof and then flows out through the discharge pipe 25, and, the flow having been started, is continued by siphon action. The pump 36 is operated just enough to start the flow and when that has been done and operation of the pump is stopped, the flow takes place through the by-pass 38 to the outlet pipe 40, the check valve 39 opening automatically to permit such flow through the by-pass.

I claim:

1. A tank comprising a tank body, partition plates dividing the body into a plurality of separate compartments, a discharge pipe running lengthwise of the tank within the body thereof and passing through the several partition plates and through one of the end plates of the tank, and connections to this common discharge pipe from the interior of each of the several tank compartments.

2. A tank comprising the combination of a tank body, a plurality of partition plates subdividing the body into a plurality of compartments, a common discharge pipe for the several compartments located within the body and passing through the several partition plates and one of the end walls of the tank and a siphon pipe located within each compartment and communicating with the common discharge pipe of all of the compartments.

3. A tank comprising a tank body, a plurality of partition plates dividing the body into a plurality of compartments, a common discharge pipe extending lengthwise of the tank and located within the body and passing through all of the partition plates and one of the end plates, a valve controlling the flow from each compartment, a connection from the said valve of each compartment to the common discharge pipe and a common operating mechanism for all of the said valves operable to select and operate any one of the valves individually.

4. A tank comprising a tank body, partition plates dividing the body into a plurality of compartments, a common discharge pipe extending lengthwise of the body and located within the body and passing through all of the partition plates and one of the end plates, a siphon within each compartment for conveying liquid from that compartment to the common discharge pipe and a siphon breaker for one of the several siphons.

5. A tank comprising the combination of a tank body, a plurality of partitions subdividing the body into a plurality of compartments, a common discharge pipe located within and extending lengthwise of the body and passing through all of the partition plates and one of the end plates of the tank, a siphon within each compartment for conveying the contents thereof to the common discharge pipe, a pump for creating a suction through the common discharge pipe and a by-pass around the pump through which the flow is continued after it has been started by the pump.

6. A tank comprising the combination of a tank body, a plurality of partitions subdividing the body into a plurality of compartments, a common discharge pipe located within and extending lengthwise of the body and passing through all of the partition plates and one of the end plates of the tank, a siphon within each compartment for conveying the contents thereof to the common discharge pipe, a siphon breaker for one of the siphons, a pump for creating a suction through the common discharge pipe and a by-pass around the pump through which the flow is continued after it has been started by the pump.

7. A tank which is subdivided into a plurality of tank compartments, each compartment provided with a siphon through which the contents of that compartment may be withdrawn, a common discharge outlet formed by connecting one leg of each of the siphons, and a siphon breaker for one of the siphons whereby siphonic action in any one of the several siphons may be stopped.

8. A tank subdivided into a plurality of tank compartments having a discharge outlet, a plurality of siphons, one for each compartment, through which the contents of the compartment may be led to the common discharge outlet, a siphon breaker on one of the siphons for closing and opening a connection to the atmosphere for the bend of that siphon, whereby the action of any one of the several siphons may be stopped, a pump for creating a suction on the liquid to be discharged and a bypass around the pump.

9. A tank subdivided into a plurality of tank compartments, valves for the several compartments controlling the outlet therefrom, siphons for the several compartments each carrying the contents of a compartment from that compartment to a discharge connection when the valve of the compartment is operated, a siphon breaker on one of the siphons and an operating mechanism for operating the several valves and the siphon breaker movable to select any one of the valves to be operated by the mechanism and to maintain the operating connection to the siphon breaker throughout such movement.

10. A tank subdivided into a plurality of tank compartments, a single discharge pipe for all of the compartments, a siphon for each compartment connecting that compartment to the discharge pipe, a valve for each compartment controlling the outlet of liquid therefrom, a siphon breaker for one of the siphons, an operating mechanism movable to select any one of the several valves and to operate the selected valve and the siphon breaker, a pump for applying suction to the liquid in a compartment whose valve has been opened and a by-pass around the pump through which the flow started by the pump is continued.

11. A tank comprising the combination of a tank body, a plurality of partition plates dividing the body into a plurality of tank compartments, a single discharge pipe for the several compartments, a valve at the bottom of each compartment controlling an outlet to the discharge pipe, an operating rod for the valve extending above the top of the tank, a siphon pipe in each compartment extending from the bottom thereof to a point above the top thereof and then to the discharge pipe, a siphon breaker for one of the siphons, an operating mechanism for the valves and the siphon breaker extending along the top of the tank and operable to select any one of said valves and also to operate the selected valve and the siphon breaker, a pump for creating a suction upon the liquid in the compartment whose valve has been opened through the siphon of that compartment and the discharge outlet, and a by-pass around the pump through which the flow started by the pump is continued.

12. A tank sub-divided into a plurality of tank compartments, a common discharge outlet, a plurality of siphons, one for each compartment, through which the contents of the compartment may be led to the said outlet, a valve controlling flow through each of the siphons, a single siphon breaker in one of the siphons, means for opening the valves selectively, means actuated by the selecting mechanism to render the siphon breaker inoperative when a selected valve is opened, and means for initiating siphonic flow.

13. A tank comprising the combination of a body sub-divided into a plurality of compartments by partitions, a common discharge pipe located within the body and passing through all the partition plates and one of the end plates of the tank, a siphon for each compartment for conducting liquid from that compartment to the common discharge pipe, and means for initiating siphonic flow.

14. A tank comprising the combination of a body sub-divided into a plurality of compartments by partitions, a common discharge pipe located within the body and passing through all the partition plates and one of the end plates of the tank, a siphon for each compartment for conducting liquid from that compartment to the common discharge pipe, valves for controlling flow through the siphons, means for operating the valves selectively, and means for initiating siphonic flow through a selected valve and its associated siphon.

15. A tank sub-divided by partitions into a plurality of compartments having a common discharge outlet, a plurality of siphons, one for each compartment, through which the contents of the compartment may be conducted to said outlet, a siphon breaker on one of the siphons, and means for initiating siphonic flow.

In testimony whereof I affix my signature.

ANDREW A. KRAMER.